United States Patent [19]

Sanchez

[11] Patent Number: 5,099,873
[45] Date of Patent: Mar. 31, 1992

[54] WATER COOLER DRAIN PAN APPARATUS

[76] Inventor: Gabriel G. Sanchez, 210 Granada, Laredo, Tex. 78041

[21] Appl. No.: 756,477

[22] Filed: Sep. 9, 1991

[51] Int. Cl.$^5$ .................. F16K 33/00; B08B 21/00; F25D 21/14
[52] U.S. Cl. .................. 137/312; 24/306; 24/442; 62/285; 73/446; 73/308; 73/49.2; 134/166 R; 137/240; 141/364; 200/61.04; 200/230; 220/571; 222/108; 222/148; 340/604; 340/605; 340/625
[58] Field of Search .................. 24/306, 442; 4/613, 4/640, 641, 661; 137/238, 240, 312, 386; 134/166 R; 141/363, 364; 220/571; 222/108, 148; 340/604, 605, 625; 62/285, 286, 288, 389; 73/40, 46, 49.2 R, 307, 308; 200/61.04, 190, 230

[56] References Cited

U.S. PATENT DOCUMENTS

| 1,038,021 | 9/1912 | Summers | 222/108 |
|---|---|---|---|
| 1,066,479 | 7/1913 | Fiala | 340/625 |
| 1,217,701 | 2/1917 | Brunelle | 340/625 |
| 1,594,248 | 7/1926 | Efstathiou | 222/108 |
| 2,674,106 | 4/1954 | Hill | 62/389 |
| 3,069,671 | 12/1962 | Taylor | 122/504 |
| 3,208,641 | 9/1965 | Brugioni | 222/108 |
| 3,473,553 | 10/1969 | Collins | 137/312 |
| 4,271,566 | 6/1981 | Perina | 24/306 |
| 4,603,558 | 8/1986 | McAdams | 62/285 |
| 4,856,672 | 8/1989 | Sullivan | 220/571 |
| 4,907,420 | 3/1990 | Mahanay et al. | 62/285 |

FOREIGN PATENT DOCUMENTS 418019 10/1934 United Kingdom ............ 134/166 R

Primary Examiner—George L. Walton
Attorney, Agent, or Firm—Leon Gilden

[57] ABSTRACT

A polymeric insert is arranged for securement within a base portion of a water cooler housing to accommodate drainage from a water cooler top wall. Drainage and condensation is accommodated to minimize corrosion of a lower portion of the water cooler housing. A modification of the structure includes a fungicide and herbicide distribution reservoir and an alarm indicating stoppage of the associated drain structure of the organization.

3 Claims, 4 Drawing Sheets

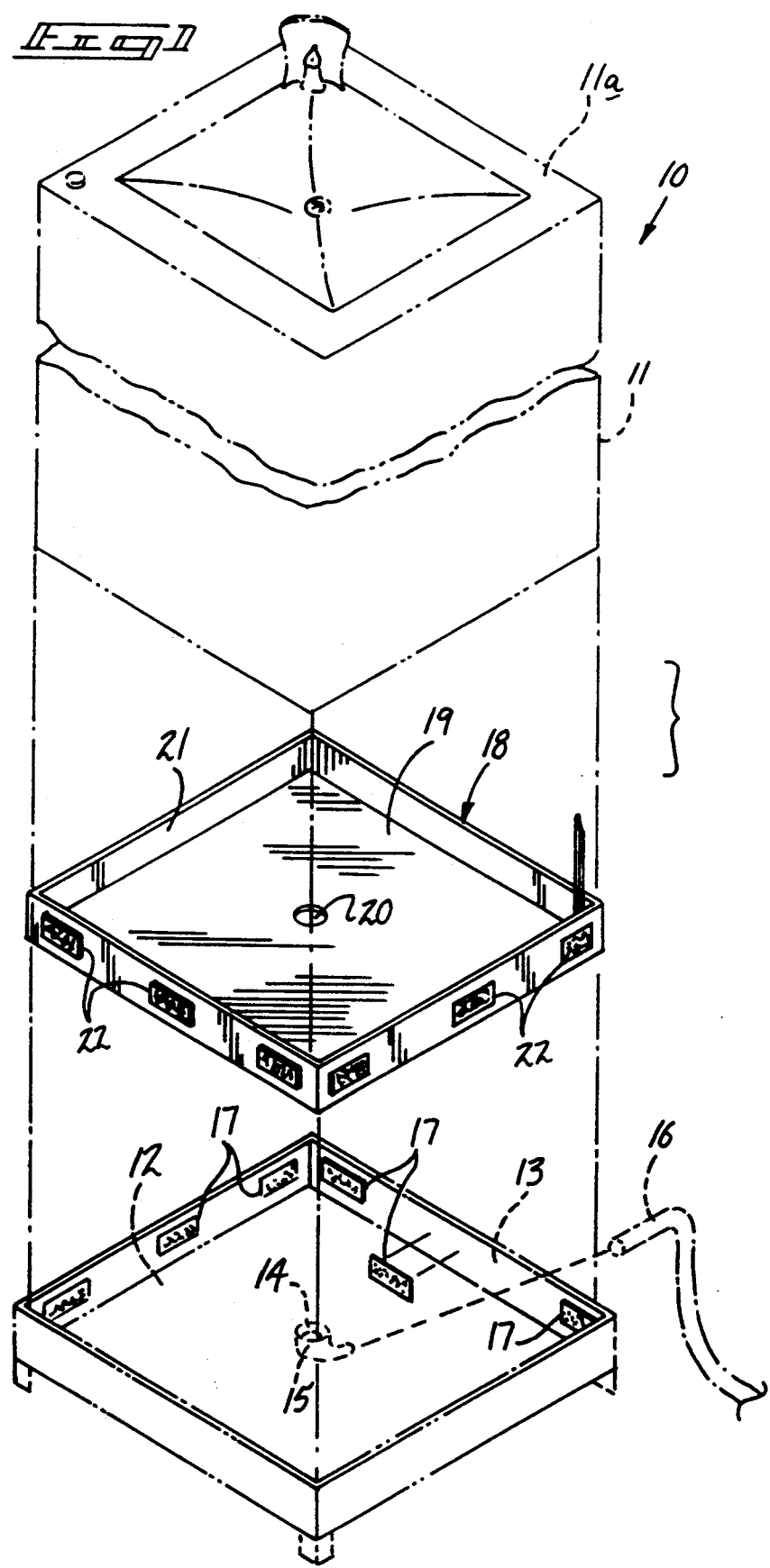

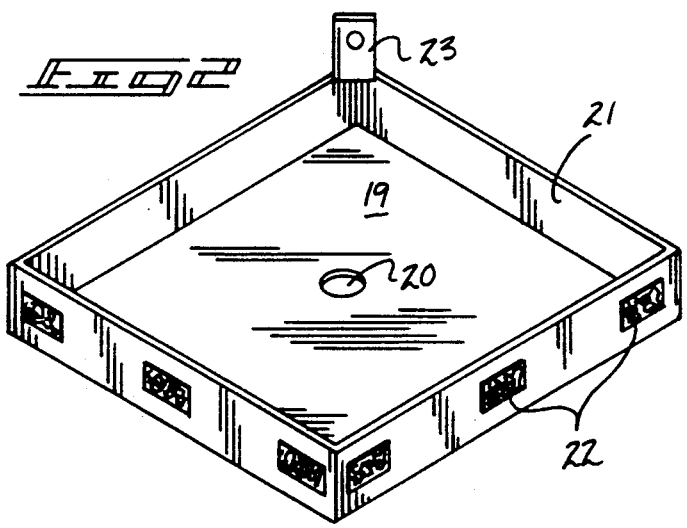
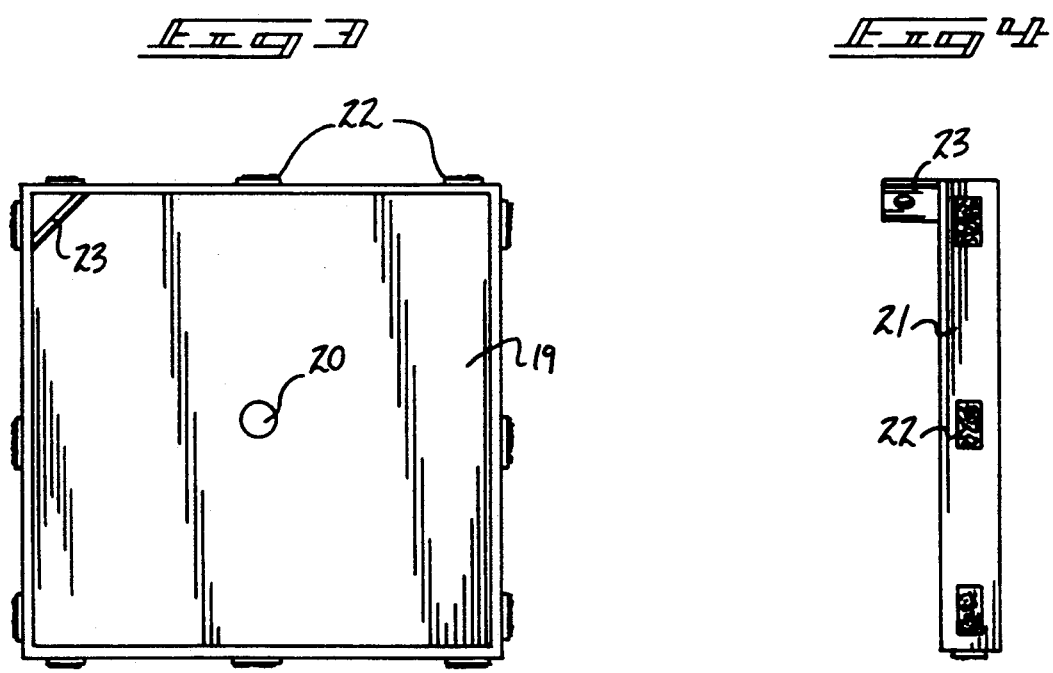

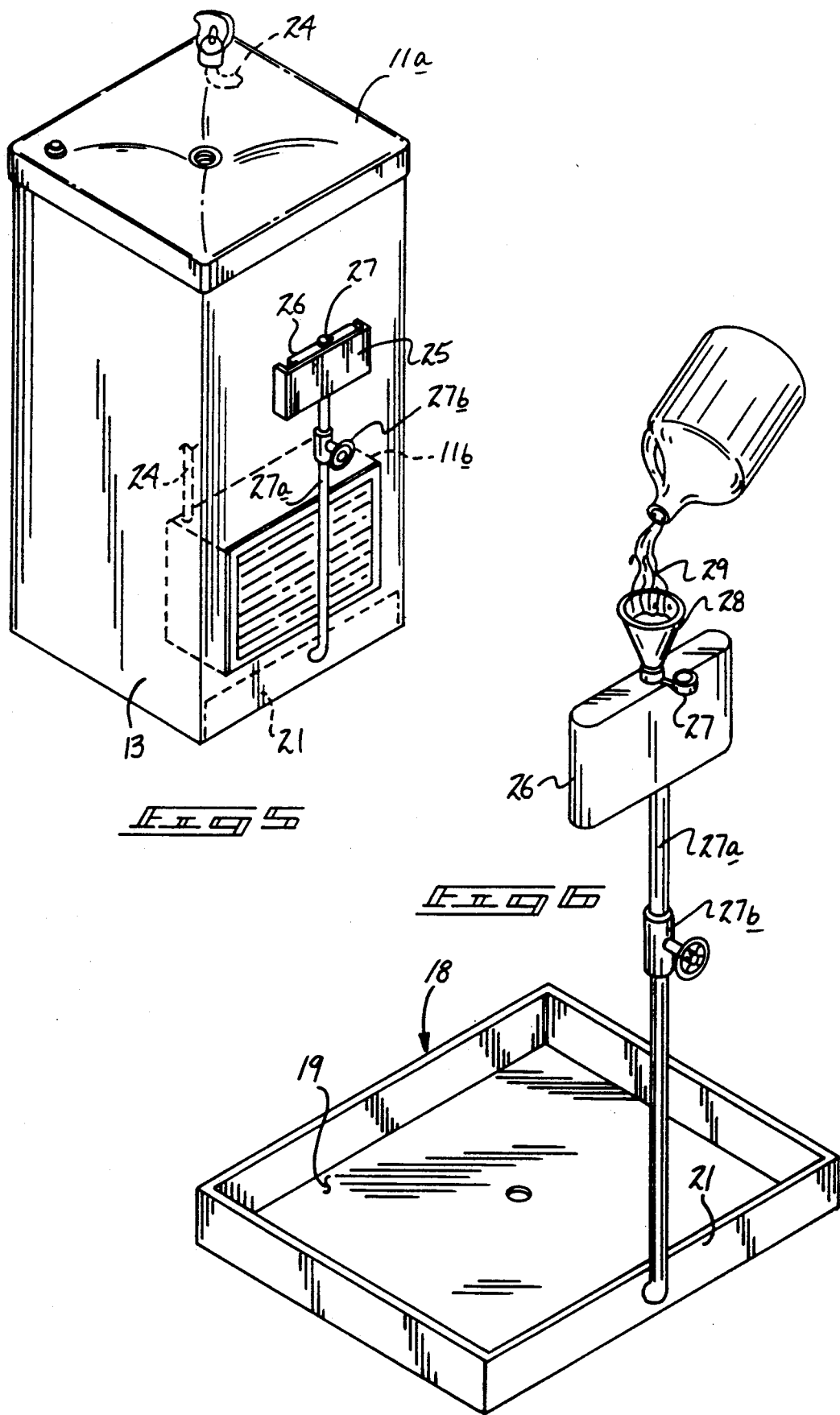

WATER COOLER DRAIN PAN APPARATUS

BACKGROUND OF THE INVENTION

1. Field of the Invention

The field of invention relates to water cooler apparatus, and more particularly pertains to a new and improved water cooler drain pan apparatus wherein the same is arranged for a condensation collection pan formed of a polymeric material mounted as an insert within a lower end portion of the water cooler housing side wall in contiguous communication with the water cooler floor.

2. Description of the Prior Art

Accumulation of condensation and moisture by utilizing a non-corrosive material is utilized in various prior art environments to avoid corrosion effected by typical condensation. Such apparatus is exemplified in U.S. Pat. No. 3,800,335 to Buonaura wherein a shower plate is arranged for accommodating water flow thereon formed of a polymeric material.

U.S. Pat. No. 3,069,671 to Taylor sets forth a drain pan mounted in an underlying relationship relative to a water heater assembly utilizing a fixed alarm to indicate accumulation of fluid within the drain pan structure, wherein the fixed alarm utilizes a rigid contact probe arrangement.

U.S. Pat. No. 4,765,360 to Baird sets forth a water heater collection pan for positioning underlying a water heater assembly.

U.S. Pat. No. 3,895,398 to Mustee and U.S. Pat. No. 3,606,617 to Frazier utilize shower stall or bathing fixtures formed of a polymeric material to accommodate moisture.

As such, it may be appreciated that there continues to be a need for a new and improved water cooler drain pan apparatus as set forth by the instant invention which addresses the problems of ease of use as well as effectiveness in construction in providing an accumulation pan structure to receive water flow thereon and avoid damage to associated housing integrity of the organization and in this respect, the present invention substantially fulfills this need.

SUMMARY OF THE INVENTION

In view of the foregoing disadvantages inherent in the known types of water cooler apparatus now present in the prior art, the present invention provides a Water cooler drain pan apparatus Wherein the same includes a polymeric pan insert arranged for securement and mounting in an interfitting relationship relative to a water cooler housing at its lower terminal end. As such, the general purpose of the present invention, which will be described subsequently in greater detail, is to provide a new and improved water cooler drain pan apparatus which has all the advantages of the prior art water cooler apparatus and none of the disadvantages.

To attain this, the present invention provides a polymeric insert arranged for securement within a base portion of a water cooler housing to accommodate drainage from a water cooler top Wall. Drainage and condensation is accommodated to minimize corrosion of a lower portion of the water cooler housing. A modification of the structure includes a fungicide and herbicide distribution reservoir and an alarm indicating stoppage of the associated drain structure of the organization.

My invention resides not in any one of these features per se but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved water cooler drain pan apparatus which has all the advantages of the prior art water cooler apparatus and none of the disadvantages.

It is another object of the present invention to provide a new and improved water cooler drain pan apparatus which may be easily and efficiently manufactured and marketed.

It is a further object of the present invention to provide a new and improved water cooler drain pan apparatus which is of a durable and reliable construction.

An even further object of the present invention is to provide a new and improved water cooler drain pan apparatus which is susceptible of a low cost of manufacture with regard to both materials and labor, and which accordingly is then susceptible of low prices of sale to the consuming public, thereby making such water cooler drain pan apparatus economically available to the buying public.

Still yet another object of the present invention is to provide a new and improved water cooler drain pan apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention in use

FIG. 2 is an isometric illustration of the drain pan structure.

FIG. 3 is an orthographic top view of the drain pan structure.

FIG. 4 is an orthographic side view of the drain pan structure.

FIG. 5 is an isometric illustration of the water cooler assembly of the invention, including a fungicide and mildew control reservoir.

FIG. 6 is an isometric enlarged view of the reservoir structure arranged relative to the drain pan of the invention.

DESCRIPTION OF THE PREFERRED EMBODIMENT

Figure 7:
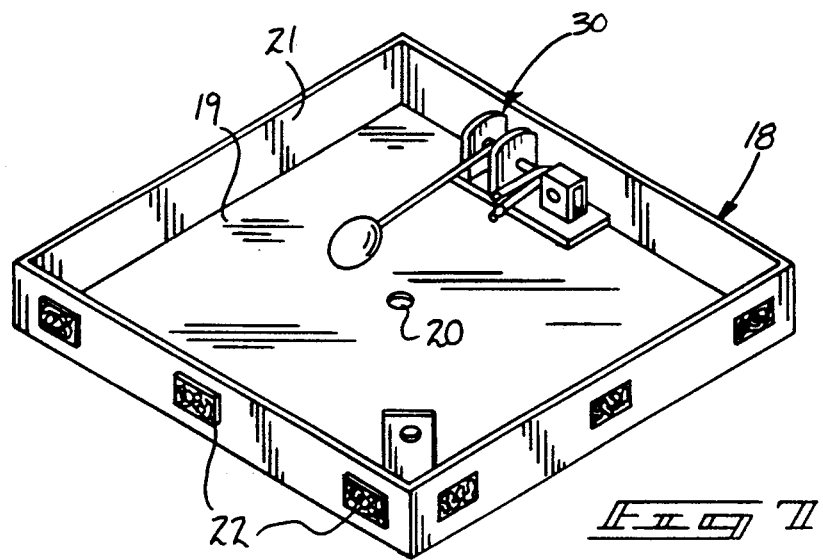
FIG. 7 is an isometric illustration of the drain pan structure utilizing an overflow alarm arrangement.

With reference now to the drawings, and in particular to FIGS. 1 to 9 thereof, a new and improved water cooler drain pan apparatus embodying the principles and concepts of the present invention and generally designated by the reference numeral 10 will be described.

More specifically, the water cooler drain pan apparatus 10 of the instant invention essentially comprises a water cooler housing 11, including a housing top wall 11a, to include housing side walls 13 formed with a housing base plate floor 12 and including a refrigerant assembly 11b (see FIG. 5). A drain opening 14 is directed through the housing base plate floor 12 in cooperation With a drain opening conduit 15 to direct excess fluid through the drain opening 14, ultimately into a drain hose 16 A plurality of hook and loop fastener patches 17 are fixedly mounted to an interior surface of the housing side walls adjacent the base plate floor 12 spaced at predetermined intervals. A polymeric drain pan 18 is provided to include a drain pan floor 19 formed with a drain pan floor opening 20 coaxially aligned with the drain opening 14. The drain pan 18 includes drain pan side walls 21 that mount a plurality of second hook and loop fastener patches 22 spaced at the predetermined intervals therealong to cooperate with the first hook and loop fastener patches 17 to secure in an interlocking relationship the drain pan 18 to the housing side walls 13 adjacent the floor 12. The hook and loop fastener structure avoids undue corrosive interrelationship between the drain pan 18 and the housing of the water cooler structure, as well as providing for a labor saving secure interlocking relationship between the drain pan 18 and the housing 11.

A water inlet conduit alignment bracket 23 is illustrated as mounted to the drain pan structure 18, to include a central aperture to direct a water inlet conduit 24 therethrough, such as the type as illustrated in FIG. 5, to maintain rigid alignment of the conduit 24 in its projection into the housing 11.

Reference to FIG. 5 illustrates the use of a reservoir housing 25 mounted to an exterior surface of the housing side wall 13 to include a reservoir container 26 therewithin to provide shielding of the container 26. The container 26 includes a fill cap 27 wherein a fill funnel 28 is provided to direct a fungicide and mildew control fluid 29 into the reservoir 27, wherein the fluid is directed into the drain pan structure 18 through a drain pan side wall 21 by way of a reservoir conduit 27a directed from the reservoir container 26 through the drain pan side wall 21. A reservoir conduit valve 27b is provided manually operative to control metering of the fluid 29 onto the drain pan floor 19.

Figure 8:
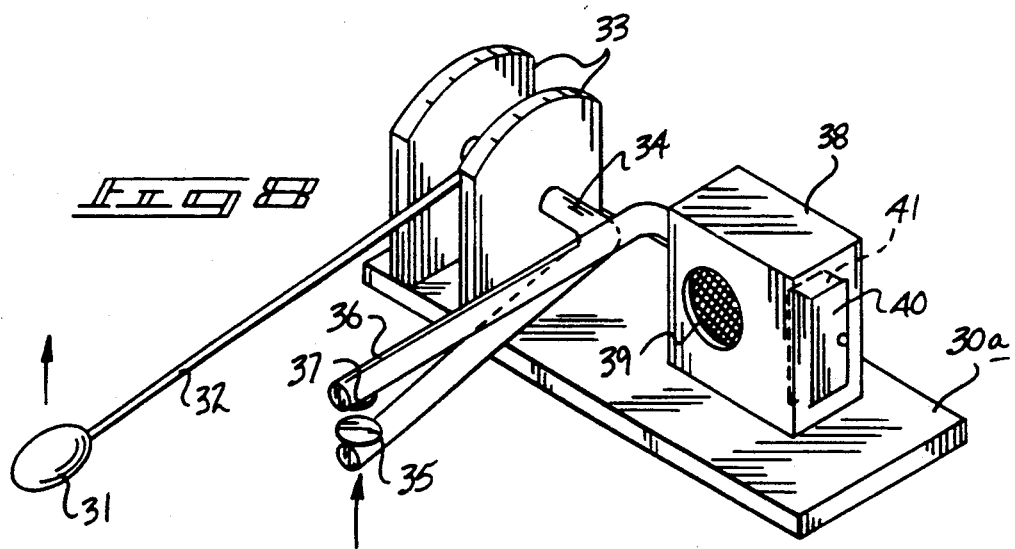
FIG. 8 is an isometric illustration, somewhat enlarged, of the alarm structure utilized by the invention.
Figure 9:
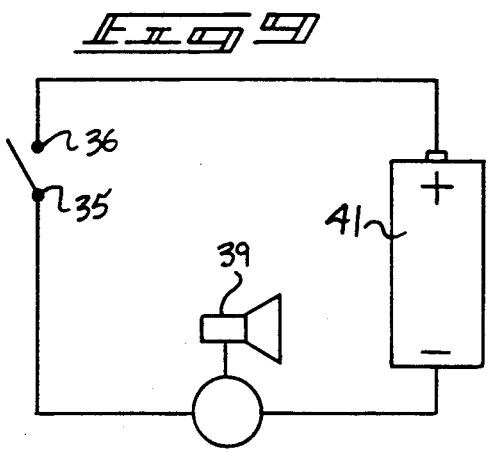
FIG. 9 is a diagrammatic illustration of electrical circuitry utilized by the alarm structure of the invention.

The FIGS. 7-9 illustrate the use of an alarm assembly 30 incorporated by the invention to provide for audible alarm of an overflow condition present within the drain pan structure 18. The alarm assembly 30 is secured to a mounting plate 30a that in turn is fixedly secured to the drain pan floor 19. A float member 31 is mounted to a forward distal end of an associated rigid first arm 32. The first arm 32 is orthogonally secured to an "L" shaped second arm 34 that is pivotally mounted within spaced parallel support plates 33 that are in turn orthogonally secured to the mounting plate 30a. The second arm 34 includes a second arm switch contact 35 mounted at a forward distal end of the second arm 35 for operative communication with a contact arm switch contact 37 mounted at a forward distal end of the contact arm 36. The contact arm 36 and the second arm 37 are arranged at an angular orientation therebetween and intersect at the forward distal end of the second arm 34 and the contact arm 36. The "L" shaped contact arm 36 is directed into an alarm housing 38 fixedly mounted to the mounting plate 38. The alarm housing 38 includes an audible alarm member 39 contained therewithin, wherein a battery 41 contained within the alarm housing 38 and accessed through a battery covered door 40 provides electrical power to the use of the organization. When the float 31 rises, the second switch contact 35 also rises to effect electrical and physical contact with the contact arm switch contact 37. The contacts 35 and 37 are positioned in a spaced relationship above the mounting plate 30a to avoid moisture or fluid interfering with proper operative association of the contacts to effect the audible alarm actuation in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A water cooler drain pan apparatus, comprising, a water cooler housing, including a housing top wall spaced from a housing floor, the housing floor and the housing top wall including housing side walls extending coextensively therebetween, and the housing floor including a drain opening directed medially thereof, with the drain opening in fluid communication with a drain hose to direct accumulated moisture within the housing through the drain hose, and a polymeric drain pan mounted within the housing in contiguous communication with the housing floor and secured fixedly to the housing side walls, and the drain pan floor including a drain pan floor opening coaxially aligned with the drain opening of the housing, wherein the polymeric drain pan includes drain pan side walls, and the housing side walls include a plurality of first hook and loop fastener patches mounted to an interior surface of the housing side walls at spaced predetermined intervals adjacent the housing floor, and the polymeric drain pan side walls including second hook and loop fastener patches mounted to an exterior surface to the drain pan side walls adjacent the drain floor, wherein the second hook and loop fastener patches are mounted at spaced predetermined intervals for mechanical registration of the first hook and loop fastener patches with the second hook and loop fastener patches 2. An apparatus as set forth in claim 1 wherein at least one of the housing side walls includes a reservoir housing fixedly mounted to a surface of the at least one housing side wall positioned intermediate the housing top wall and the housing floor, with the reservoir housing mounting a reservoir container therewithin, the reservoir container including a fill cap formed at an upper end of the reservoir container and a reservoir conduit projecting through a lower end of the reservoir container, wherein the reservoir conduit is directed into the polymeric drain pan through one of said drain pan side walls, wherein the reservoir housing includes a fungicide and mildew control fluid contained therewithin to direct the fluid onto the drain pan floor, and a reservoir conduit valve mounted within the reservoir conduit, wherein the reservoir conduit valve effects selective metering of the fluid directed from the reservoir container to the drain pan floor.

3. An apparatus as set forth in claim 2 including an alarm assembly fixedly mounted to the drain pan floor, wherein the alarm assembly includes a mounting plate, the mounting plate including a plurality of support plates fixedly and orthogonally mounted to a top surface of the mounting plate, wherein the support plate includes an "L" shaped second arm rotatably mounted between the support plates and extending forwardly of the support plates and the mounting plate, and a first arm fixedly and orthogonally intersecting the second arm intermediate the support plates, wherein the first arm includes a float member mounted at a forward distal end of the first arm, and the second arm includes a second arm switch contact mounted at a top surface of the second arm at a forward distal end of the second arm, and an alarm housing fixedly mounted to the support plate spaced from the second arm, wherein the alarm housing includes an alarm member contained therewithin, and the alarm housing includes an "L" shaped rigid contact arm extending exteriorly of the alarm housing and extending forwardly of the mounting plate, wherein the "L" shaped contact arm includes an "L" shaped contact arm forward distal end, wherein the "L" shaped contact arm forward distal end is positioned adjacent the second arm forward distal end, wherein the "L" shaped arm forward distal end includes an "L" shaped contact arm switch contact mounted to a bottom surface of the "L" shaped contact arm to overlie the second arm switch contact, whereupon raising of the float member effects mechanical and electrical communication between the second switch contact and the contact arm switch contact, and the alarm housing includes a battery member to provide electrical energy for the alarm member, wherein electrical communication between the second switch contact and the contact arm switch contact effects actuation of the alarm member.

* * * * *